United States Patent
Yeshayahu

(10) Patent No.: US 8,624,782 B2
(45) Date of Patent: *Jan. 7, 2014

(54) METHOD AND APPARATUS FOR UTILIZATION OF LOCATION DETERMINATION SIGNAL SAMPLES IN NOISY ENVIRONMENTS

(75) Inventor: Yerachmiel Yeshayahu, Ra'Anana (IL)

(73) Assignee: Marvell International Ltd., Hamilton (BM)

( * ) Notice: Subject to any disclaimer, the term of this patent is extended or adjusted under 35 U.S.C. 154(b) by 657 days.

This patent is subject to a terminal disclaimer.

(21) Appl. No.: 12/911,511

(22) Filed: Oct. 25, 2010

(65) Prior Publication Data

US 2011/0037644 A1 Feb. 17, 2011

Related U.S. Application Data

(63) Continuation of application No. 12/052,473, filed on Mar. 20, 2008, now Pat. No. 7,821,456.

(60) Provisional application No. 60/896,104, filed on Mar. 21, 2007.

(51) Int. Cl.
*G01S 3/02* (2006.01)
*G01S 19/42* (2010.01)

(52) U.S. Cl.
USPC .................................. 342/451; 342/357.25

(58) Field of Classification Search
USPC ................. 342/357.2, 357.25, 451, 463–465; 701/468, 469
See application file for complete search history.

(56) References Cited

U.S. PATENT DOCUMENTS

| | | | |
|---|---|---|---|
| 5,884,215 A | | 3/1999 | Birchler et al. |
| 7,821,456 B2 * | | 10/2010 | Yeshayahu ............ 342/451 |
| 2008/0074317 A1 | | 3/2008 | Harper et al. |
| 2008/0248743 A1 | | 10/2008 | Krinsky |
| 2009/0149197 A1 | | 6/2009 | Morgan et al. |

* cited by examiner

*Primary Examiner* — Dao Phan

(57) ABSTRACT

An apparatus for location determination includes a location determination receiver configured to receive location determination signals, a location determination signal quality assessment component configured to assess a quality of received location determination signals, and a location determination processor responsive to an output of the location determination signal quality component. The apparatus determining a location of the location determination receiver based on the location determination signals that are received during time periods when the location determination signal meets or exceeds a location determination signal quality threshold. A method for location determination is also disclosed.

20 Claims, 7 Drawing Sheets

METHOD AND APPARATUS FOR UTILIZATION OF LOCATION DETERMINATION SIGNAL SAMPLES IN NOISY ENVIRONMENTS

CROSS-REFERENCE TO RELATED APPLICATIONS

This application is a Continuation of U.S. application Ser. No. 12/052,473 filed on Mar. 20, 2008 and issued on Oct. 26, 2010 as U.S. Pat. No. 7,821,456, which claims priority under 35 U.S.C. §119(e) to U.S. Provisional Application No. 60/896,104, filed on Mar. 21, 2007, the disclosure of which are expressly incorporated by reference herein in their entirety.

BACKGROUND

1. Field

The method and apparatus are directed generally to efficient utilization of location determination signals to determine location in noisy environments, and more particularly to efficient utilization of location determination signals for location determination in noisy environments that results in reduced power usage and/or increased computing resources.

2. Related Art

There currently exist a number of location determination methods and apparatuses. For example, one common system is the Global Positioning System (GPS) which utilizes a constellation of medium earth orbit satellites that transmit precise microwave signals. These signals allow a suitable receiver to determine a position location.

GPS devices typically employ a time consuming process to find GPS signals and subsequently solve location equations to determine the location of a user and their mobile station.

Many GPS systems exist on platforms or are used in environments in which other RF receivers such as cellular telephones, wireless fidelity (WiFi), Bluetooth, Ultra-wideband, Wi-MAX, or any other radio frequency interferences from other communication devices interfere with GPS reception. Similarly GPS signals may fade or become degraded due to changing environmental conditions. Attempts to determine location in poor reception conditions may cause various problems, including but not limited to, inefficient use of power resources available to a GPS device.

SUMMARY

In accordance with an aspect of the invention, a method and apparatus are provided to predict various parameters in a noisy environment and control a GPS receiver to avoid wasting power resources and/or computing resources during periods of noise. The result is that there is an improvement in the use of the GPS samples in noisy environments, particularly when the magnitude of noise fluctuates, while minimizing the adverse affect on location determination. This further results in a shorter time to first fix in obtaining a location determination in noisy environments. Various advantages may result including an improvement in the power consumption of the GPS apparatus in noisy environments and especially during acquisition mode, an improvement in the tracking mechanism in a number of cases, and better service of the various location applications. Further benefits will be apparent in the discussion that follows.

The invention may be implemented in a number of ways. According to an embodiment of the invention an apparatus for location determination includes a location determination receiver configured to receive location determination signals, a location determination signal quality assessment component configured to assess a quality of received location determination signals, and a location determination processor responsive to an output of the location determination signal quality component for determining a location of the location determination receiver based on the location determination signals that are received during time periods when the location determination signal meets or exceeds a location determination signal quality threshold.

According to another embodiment of the invention a method for location determination includes determining whether or not there is radio frequency interference caused by a transmitter, receiving location determination signals for determining a location based on the location determination signals, and controlling a processing of received location determination signals in response to the determination of radio frequency interference caused by the transmitter.

Additional features, advantages, and embodiments of the invention may be set forth or apparent from consideration of the following detailed description, drawings, and claims. Moreover, it is to be understood that both the foregoing summary and the following detailed description provide examples and are intended to provide further explanation without limiting the scope of the invention as claimed.

BRIEF DESCRIPTION OF THE DRAWINGS

The accompanying drawings illustrate embodiments of the invention. No attempt is made to show structural details in more detail than may be necessary for a fundamental understanding of teaching principles and the various ways in which the claimed invention may be practiced. In the drawings:

DETAILED DESCRIPTION

Figure 1:
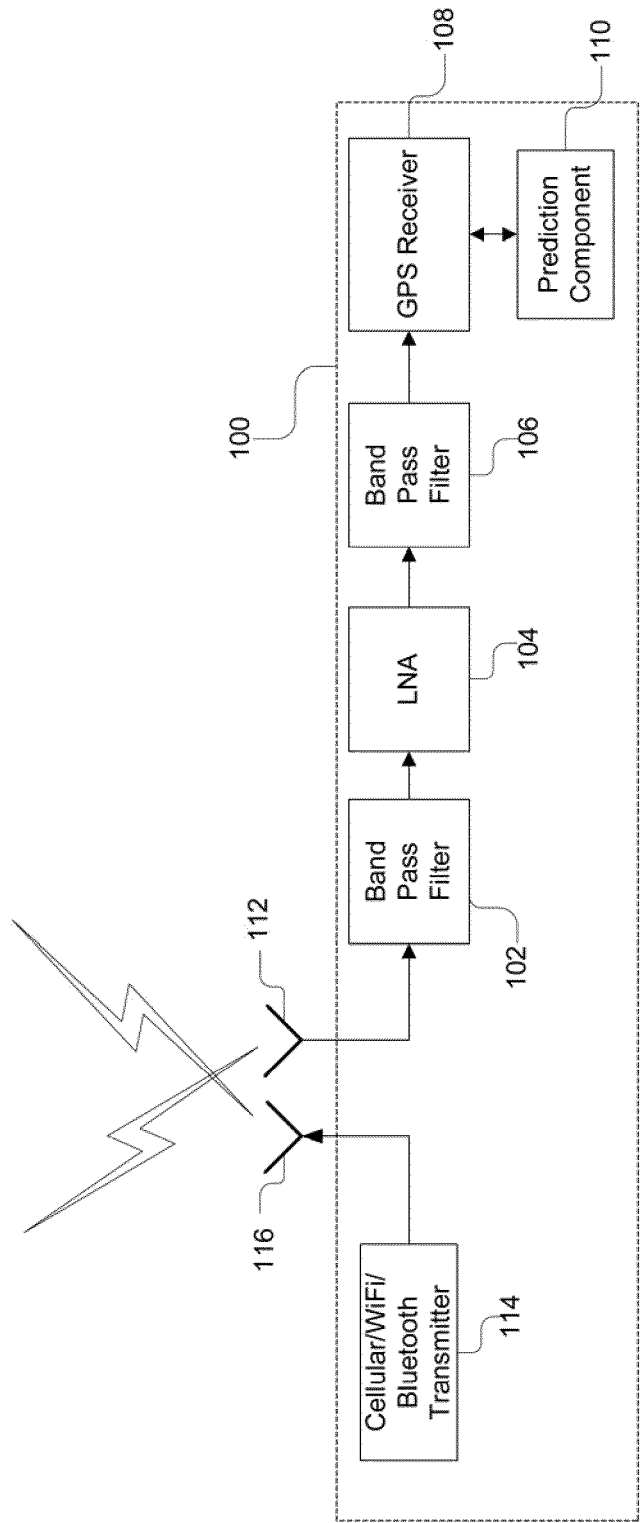
FIG. 1 is an exemplary block diagram of a mobile device configured in accordance with an embodiment.

The embodiments of the invention and various features and details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as would be apparent to a skilled artisan, even if not explicitly stated herein. Descriptions of well-known components and processing techniques may be omitted so as to not unnecessarily obscure teaching principles of embodiments of the invention. The examples and embodiments herein should not be construed as limiting the scope of the claimed invention, which is defined solely by the appended claims and applicable law. Moreover, it is noted that like reference numerals represent similar parts throughout the several views of the drawings.

FIG. 1 is a block diagram showing a device, such as a mobile device, a cellular telephone, or PDA constructed and arranged in accordance with an embodiment. In particular, FIG. 1 shows a mobile station 100 that may include an antenna 112 that is used to receive GPS signals from one or more GPS satellites of a GPS satellite constellation. The mobile station 100 may further include a band pass filter 102 operating as is well known in the art to select a particular frequency band to pass through to an output. The output of the band pass filter 102 is input to a low noise amplifier (LNA) 104. The low noise amplifier is a special type of amplifier used in communication systems to amplify weak signals received by the antenna 112. The output of the amplified signal from the low noise amplifier 104 is then fed to a second band pass filter 106. The second band pass filter 106 passes frequencies within a certain range and rejects or attenuates other frequencies. The band pass filter 106 passes some signals on to the GPS receiver 108.

The mobile station 100 further includes a prediction component 110. The prediction component 110 may be used to predict start and/or stop times of different signals that interfere with the GPS reception resulting in undesirable noise that may cause the mobile station to operate with a lower performance and/or higher power usage. The mobile station 100 may also include a transmitter 114. The transmitter 114 may be a cellular transmitter, a WiFi transmitter, a Bluetooth transmitter, an Ultra-wideband transmitter, a Wi-MAX transmitter, and the like. The transmitter 114 transmits signals from antenna 116. The signals may cause interference within the mobile station 100. The prediction component 110 controls the GPS receiver 108 to operate at those times when the signals from transmitter 114 do not generate enough interference to keep the GPS receiver 108 from being able to determine a location. In particular, the prediction component 110 may use knowledge of when other transmitters/receivers are operating in a manner that interferes. The prediction component 110 may also base controlling on actual measurement software and the like. The prediction component 110 may operate according to the process described in further detail below or may use another type of process to control the GPS receiver 108 to operate at low interference times based on the interference generated at least by the transmitter 114. There may also be signal degradation due to environmental conditions etc.

The prediction component 110 may allow for non-continuous acquisition and/or tracking of GPS signals that may utilize short non-continuous bursts of samples of the signal, while providing a user with a continuous indication of location during movement of a GPS receiver unit 118 (the user may not even be aware that the GPS signals are acquired non-continuously).

The prediction component 110 may also determine time slots of suitable use GPS signals (either as a function of knowledge of system noise or from within the signal itself), only acquiring GPS signals during non-continuous time slots in which the signals are suitable and then only processing the suitable signals for making location determination.

The prediction component 110 may also acquire GPS signals, determining a characteristic of the signals that may be suitable, and then performing different processes as a function of the GPS signal characteristics. For example, when a signal is of insufficient quality (determination may be made as function of knowledge of system noise or signal analysis), the prediction component 110 may not use the poor signals for making any location determination.

Figure 2:
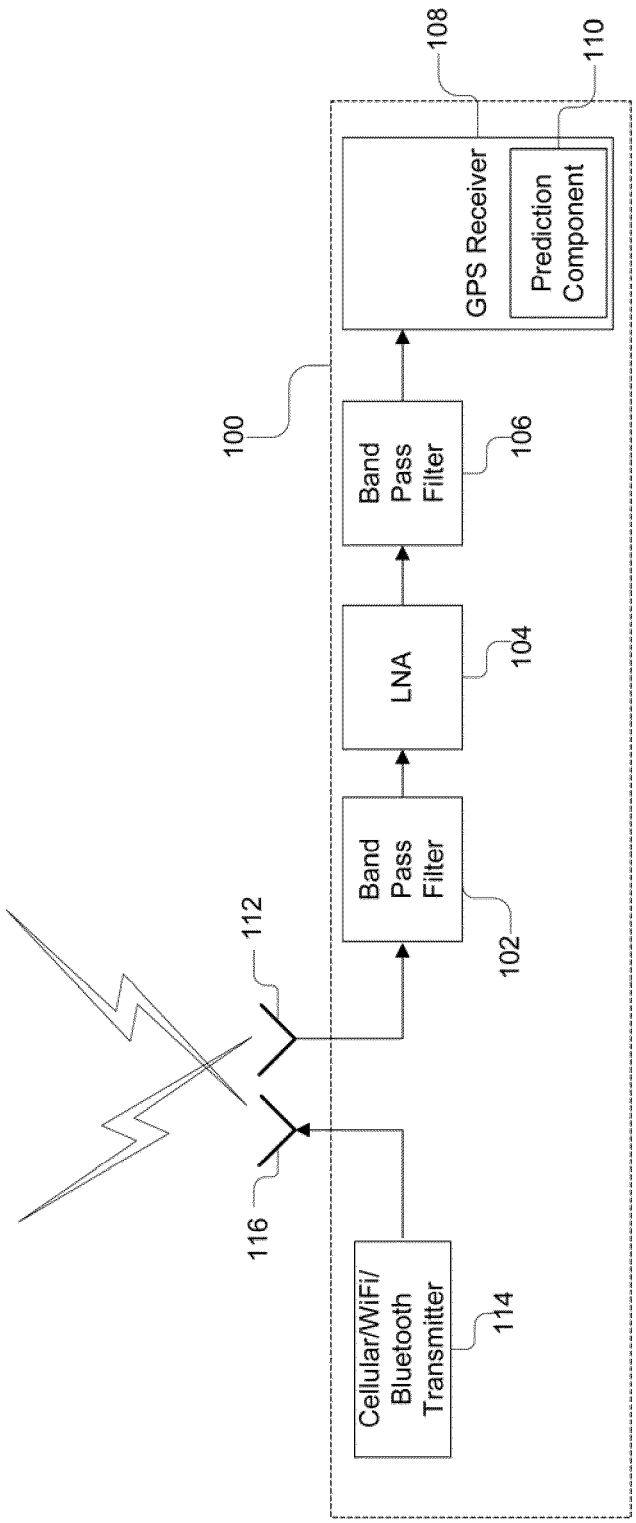
FIG. 2 shows a mobile device configured in accordance with another embodiment.

As further shown in FIG. 1, the prediction component 110 is shown as a separate component within the mobile station 100. As shown in FIG. 2, both the prediction component 110 and the GPS receiver 108 may be combined in a single component. Of course other arrangements or a mobile station having additional receivers/transmitters or an additional arrangement of components is contemplated.

Figure 3:
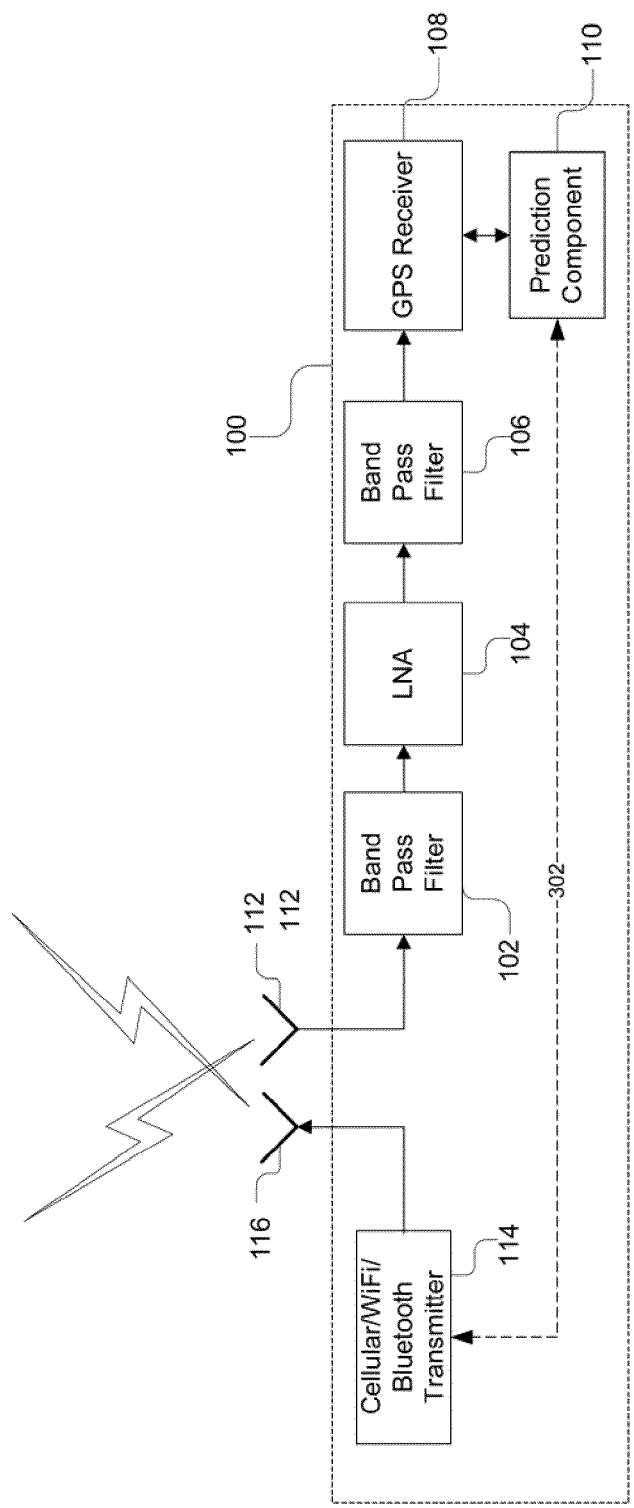
FIG. 3 shows a mobile device configured in accordance with another embodiment.

FIG. 3 shows an interconnection between the transmitter 114 and the prediction component 110. This interconnection 302 provides a signaling input from the transmitter 114 to the prediction component 110 providing an indication of the start and/or stop time of possible sources of interfering signals to the prediction component 110, so that the prediction component 110 may more accurately control the operation of the GPS receiver 108. The interfering signals (in a non-physics sense) cause undesirable noise, signal degradation, or may actually, but not necessarily "interfere."

The determination of whether or not there is interference by the prediction component 110 may be determined by prior or real time knowledge of times when the other transceivers are in question, for example prediction component 110 may have knowledge of TDMA time slots, or when a call is being received, paging signals are received, etc. or may be made by calculations, measurements, or both. In particular, the interfering signals from a transmitter that is on the same platform (or adjacent platform) may be based on known protocols, frequencies, amplitudes, time durations, signaling, and so on. These known actions may be stored in a look-up table or calculated in the prediction component 110. Additionally or alternatively, the determination of interfering signals may be determined by radio frequency measurement or other sensing that may result in the determination of a noisy environment or other interfering signals.

It should be noted that the particular arrangement of the mobile station 100 shown in FIG. 1 is presented as an example. That is to say that the band pass filter 102, low noise amplifier 104 and band pass filter 106 may be replaced by greater or fewer components. Additionally, the fact that there are two antennae 112, 116 is merely for this example and there may be greater or fewer antennae providing transmission and reception of any number of wireless signals including MIMO arrays, diversity receivers, etc. Now the process that may be used in the mobile station 100 will be described in greater detail below.

Figure 4:
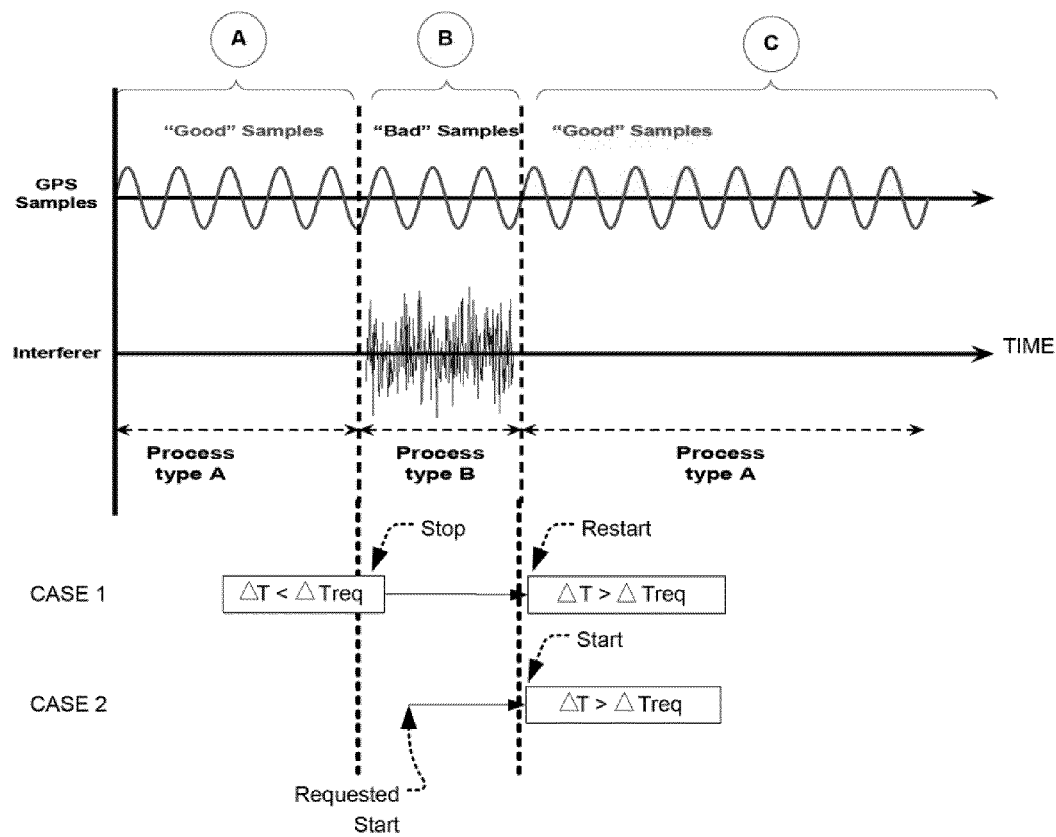
FIG. 4 shows examples of wave patterns.

FIG. 4 shows several examples of wave patterns of GPS signal samples and other signals that interfere causing degradation of the GPS signal. In particular FIG. 4 shows two separate radio frequency signals plotted with respect to time. The upper line shows GPS samples during three time periods. The first time period A on the left, time period B in the middle and time period C on the right. The interfering signal time plot (interferer) shown in the lower line shows no interfering signals during time period A, shows the existence of interfering signals during time period B, and shows no interfering signals during time period C. Accordingly, GPS samples acquired during the period A may be considered good samples in that a GPS apparatus may be able to readily use these samples to determine a location. On the other hand, the GPS samples acquired during the period B may be considered "bad samples" and the GPS apparatus may not be able to calculate/determine a location or may require more time or processing resources to calculate/determine a location when using samples acquired during period B. The subsequent time period C, samples are good samples, as the interfering signals are no longer present in the spectrum and a location may be readily determined using samples acquired in time period C.

The apparatus described above and the process described below addresses these cases. As shown in case one, the GPS system attempts to obtain a clean set of GPS signals during time period A. The GPS apparatus requires a certain amount of time in order to obtain a good sample. This time period is referred to as $\Delta t_{req}$. In case one, the GPS apparatus starts the reception process during time period A. However, the reception time ($\Delta t$) is not long enough and extends into time period B during which period interfering signals are transmitted or received. Accordingly, the apparatus and process of the invention may suspend or stop the GPS reception and/or location determination process during interference, and knowing or having a good prediction of when the interfering signals may stop, may continue or restart the sampling process at the start of time period C. Accordingly, the GPS system is able to reduce power consumption and save computing resources. In case two, also shown in FIG. 4, the requested start of a sampling process occurs during time period B. The prediction component and process of the invention may suspend the sampling process until time period C at which time the receiver may obtain a full clean sample ($\Delta t > \Delta t_{req}$). Again processor resources are saved and power consumption is reduced.

It should be noted that $\Delta t_{req}$ is the time that a GPS receiver needs to receive GPS signals to make a location determination. At must be greater than $\Delta t_{req}$. $\Delta t_{req}$ may vary depending on the GPS system and may also vary depending on three different scenarios. The three different scenarios are cold, warm and hot. The cold scenario is with respect to when the GPS receiver has missing or in accurate estimates of its position, velocity, time and/or visibility of any GPS satellites. In this regard, the receiver must systematically search for all possible signals from the constellation of satellites. After acquiring one or more satellite signals, the receiver must then obtain information regarding other satellites and in particular the almanac. The almanac is typically transmitted from the satellites over several minutes. The next scenario is the warm scenario. The receiver has some estimates of the current time and current position and may have some valid almanac data. However, it still must acquire each satellite signal and obtain the satellites detail orbital information. Finally, the hot scenario is when a GPS apparatus has a valid time, position, almanac and other data enabling a rapid acquisition of satellite signals. Accordingly, the $\Delta t_{req}$ for a time to first fix (TTFF) is based on whether or not a GPS apparatus is currently in a cold, warm, or hot scenario. The process in which the GPS system may operate will now be discussed with reference to FIG. 5. It should be noted that the apparatus shown in FIGS. 1 to 3 may use a different process than described herein providing the same functionality.

Figure 5:
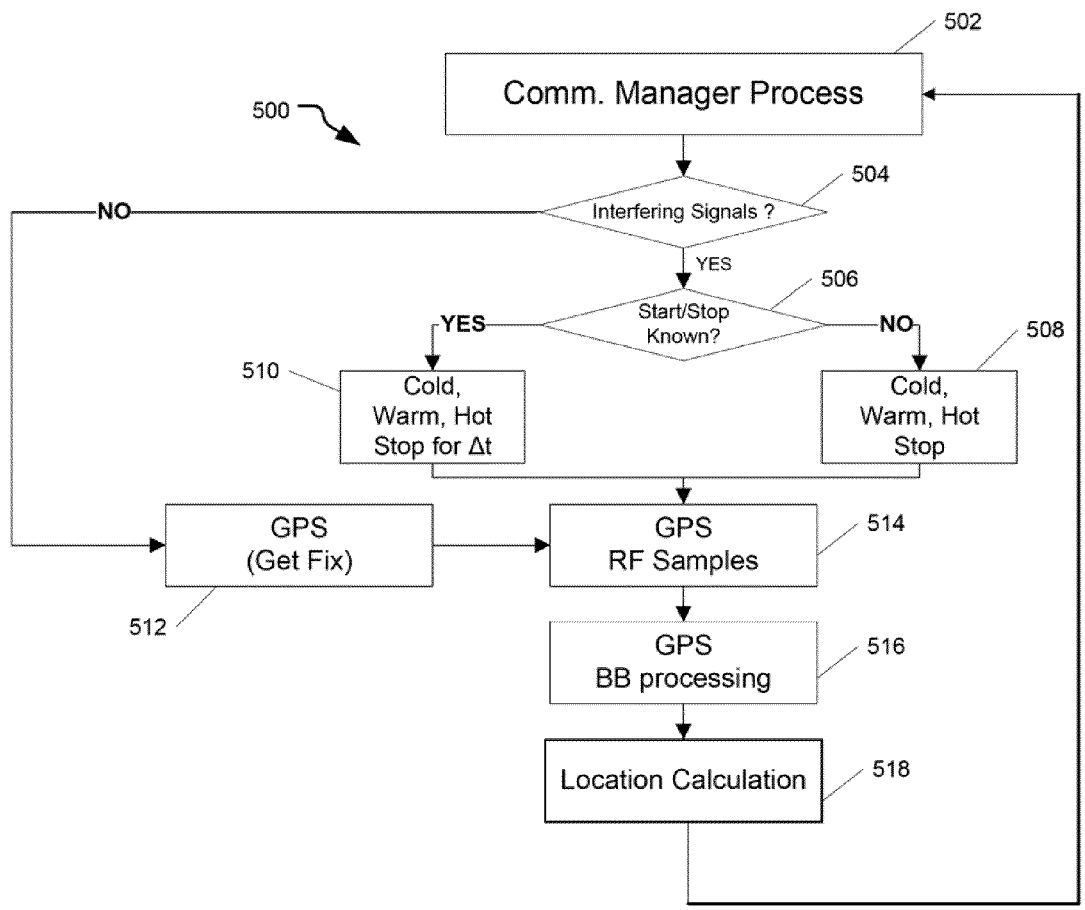
FIG. 5 shows a flow diagram of a process for operating a mobile device in accordance with an embodiment.

FIG. 5 shows an exemplary process operating according to the principles of an embodiment of the invention. In particular, FIG. 5 shows a process for reducing power consumption and/or saving processing resources for a GPS receiver operating in noisy environments. The process 500 shown in FIG. 5 includes a communications manager process 502 for the efficient utilization of location determination signals. The first step in the process may be to determine whether or not there is any current interfering signals or other type of noise within the environment as shown by 504. If there is no current interfering signals or noise, then the logic may move forward to 512 and the GPS receiver may obtain a fix on the various signals from the satellite of the GPS constellation. Thereafter, the radio frequency samples from the GPS system may be obtained as shown in 514. Next, the GPS base band processing may begin as shown in 516, and the position calculation process may begin and be completed as shown in 518.

If however on the other hand, there are interfering signals or other noisy signals determined in 504, the processing may not move to GPS 512, but instead may stop and execute the process described in further detail below. The determination of whether or not there is interference may be found by calculations, measurements, or both. In particular, the interfering signals from a transmitter or received in a receiver may be based on known protocols, frequencies, amplitudes, time durations, signaling, and so on that are caused by the transmitter that is on the same platform or in the same mobile station as the GPS receiver. In this regard, known actions may cause interference, accordingly such actions may be signaled to the GPS receiver to provide an indication of interference or possible interferences in 504. Additionally, the determination of interference as shown in 504 might be via some form of radio frequency measurement or other sensing that may result in the determination of a noisy environment or other interference. In any event, any type of known interference and any ability to ascertain that there is a noisy environment and/or interference is within the scope and spirit of the invention in determination of interference as shown in 504.

In 506, a determination is made whether or not the start time and/or stop time are known for the interference. In this regard, the transmitter that is part of the platform of the GPS receiver or mobile station is operating may provide and indication on the length of time (start and/or stop time) of the transmission of interfering signals. Alternatively the period of time may be known, for example set by standards. Such information may be stored in a look up table, such that when a particular activity is used or started, that information may be obtained in the look up table to provide a start and/or stop time that may be used for further processing. In that regard, as shown in 510, when a start and stop time is known, the GPS receiver may stop for a predetermined time until the known interference may be gone. This works for each of the cold, warm, hot scenarios. After the predetermined time has lapsed then the process may flow to the GPS radio frequency sample 514 and may go forward in accordance with the process that is described above.

On the other hand if the start and stop time are not known in 506, then the flow of logic may move to 508. In 508, the process may stop until the interference has stopped regardless of whether or not the GPS receiver is currently operating in a cold, warm or hot scenario. This may allow whatever interference and/or noisy environment currently complicating the position calculation process to change or stop. Once the interference has stopped, then the process may again start obtaining the GPS signals as described in 514, 516, and 518 described above.

Figure 6:
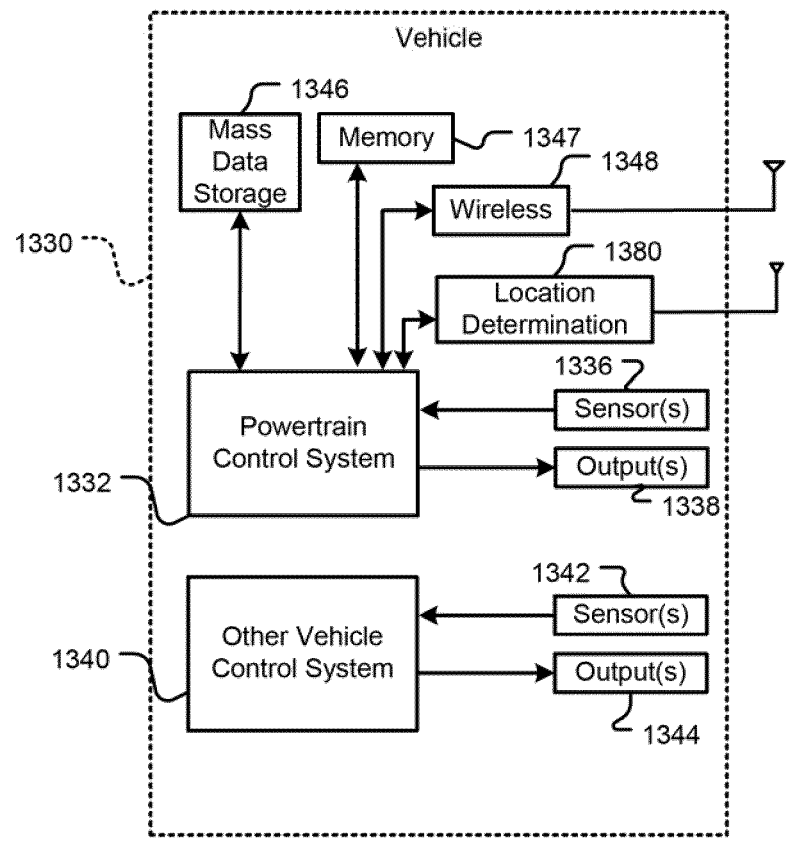
FIG. 6 shows a vehicle control system in which the devices are configured in accordance with an embodiment.
Figure 7:
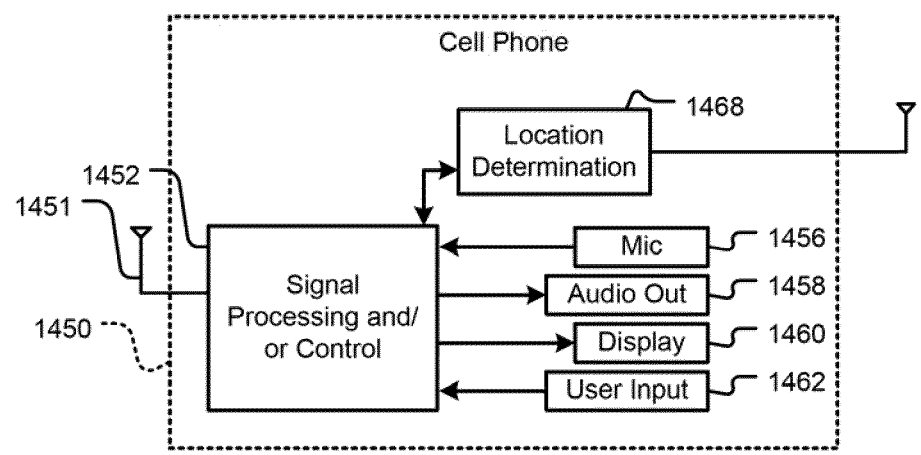
FIG. 7 shows a cellular telephone in which devices are configured in accordance with an embodiment.

Referring now to FIGS. 6 and 7 various examples of applications in which embodiments of the invention may be implemented are shown.

Referring now to FIG. 6, the apparatus and process may be implemented in a location determination system of a wireless system 1348 and location determination system 1380 of a vehicle 1330. Accordingly, the apparatus allowing the wireless system 1348 and location determination system 1380 to be more efficient. In some implementations, the vehicle may include a power train control system 1332 that receives inputs from one or more sensors 1336 such as temperature sensors, pressure sensors, rotational sensors, airflow sensors and/or any other suitable sensors and/or that generates one or more output control signals from an output 1338 such as engine operating parameters, transmission operating parameters, and/or other control signals.

The vehicle may also include other control systems 1340. The control system 1340 may likewise receive signals from input sensors 1342 and/or output control signals to one or more output devices 1344. In some implementations, control system 1340 may be part of an anti-lock braking system (ABS), a navigation system, a telematics system, a vehicle telematics system, a lane departure system, an adaptive cruise control system and the like. Still other implementations are contemplated.

A power train control system 1332 may communicate with mass data storage 1346 that stores data in a nonvolatile manner. Mass data storage 1346 may include optical and/or magnetic storage devices for example hard disk drives HDD and/or DVDs. Power train control system 1332 may be connected to memory 1347 such as RAM, ROM, low latency nonvolatile memory such as flash memory and/or other suitable electronic data storage. Power train control system 1332 also may support connections with the wireless system 1348 that may be implemented as a WLAN via a WLAN network interface. The control system 1340 may also include mass data storage, memory and/or a WLAN interface (all not shown). The wireless system 1348 may be any type of wireless communication protocol.

Referring now to FIG. 7, the apparatus and process may be embodied in a cellular phone 1450 that may include a cellular antenna 1451 and a location determination component 1468 so as to make the same more efficient. The invention may implement either or both signal processing and/or control circuits, which are generally identified in FIG. 7 at 1452. In some implementations, cellular phone 1450 includes a microphone 1456, an audio output 1458 such as a speaker and/or audio output jack, a display 1460 and/or an input device 1462 such as a keypad, pointing device, voice actuation and/or other input device. Signal processing and/or control circuits 1452 and/or other circuits (not shown) in the cellular phone 1450 may process data, perform coding and/or encryption, perform calculations, format data and/or perform other cellular phone functions.

Although reference is made to some specific wireless protocols, any wireless protocol is within the scope of the invention. For example, Bluetooth, wireless-fidelity (Wi-Fi—IEEE 802.11), fixed wireless access (WiMAX—IEEE 802.16), ultra wideband (UWB), WCDMA (wideband code-division multiple access) or any other known technology using a licensed or unlicensed frequency band. Similarly, although GPS is referenced, the position location determination signals may include GLONASS signals or Galileo signals. Moreover, any future enhancement of a current protocol or any future wireless protocol is contemplated for use with the invention.

Although the invention has been described in terms particular embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method for location determination comprising:
    receiving location determination signals for determining a location based on the location determination signals;
    assessing a quality of the received location determination signals for determining a location; and
    controlling a processing of the received location determination signals in response to the assessed quality, to avoid using the location determination signals for determining a location when the received location determination signals fail to meet or exceed a signal quality threshold.

2. The method according to claim 1, further comprising transmitting signals, wherein the signals comprise at least one of a cellular, wireless fidelity (Wi-Fi), Ultra-wideband, Wi-MAX, and Bluetooth signals.

3. The method according to claim 1, wherein receiving location determination signals further comprises receiving at least one of GPS signals, GLONASS signals, and Galileo signals.

4. The method of claim 2, further comprising determining whether there is radio frequency interference caused by the transmitting.

5. The method according to claim 4, wherein determining radio frequency interference is based on at least one of a look-up table of predetermined interference characteristics of the transmitting, calculations of predetermined interference characteristics of the transmitting and measurements of interference by the transmitting.

6. The method according to claim 4, wherein determining radio frequency interference is based on at least one of protocols governing frequencies, amplitudes, time durations, and signaling of the transmitting.

7. The method according to claim 4, further comprising suspending the start of location determination during time periods of radio frequency interference.

8. The method according to claim 4, further comprising stopping location determination during time periods of radio frequency interference.

9. The method according to claim 8, further comprising restarting location determination after radio frequency interference is reduced to below a predetermined level or threshold.

10. A method for location determination comprising:
    receiving location determination signals for determining a location based on the location determination signals;
    assessing a location determination signal quality of the received location determination signals; and
    controlling a processing of the received location determination signals in response to the assessed quality and suspending determining a location when the received location determination signals fail to meet or exceed a threshold.

11. An apparatus for location determination comprising:
    a location determination receiver configured to receive location determination signals;
    a location determination signal quality assessment component configured to assess a location determination quality of received location determination signals; and
    a location determination processor responsive to the location determination signal quality assessment component to avoid using the location determination signals for determining a location when the received location determination signals fail to meet or exceed a signal quality threshold.

12. The apparatus for location determination claimed in claim 11, wherein the location determination processor is configured to make location determinations during periods of time when location determination signals meet or exceed the location determination quality threshold.

13. The apparatus for location determination claimed in claim 12 wherein the location determination processor determines a location based on quality location determination signals received during non-contiguous periods of time.

14. The apparatus for location determination claimed in claim 11 wherein the apparatus for location determination includes RF components in addition to the location determination receiver, and the location determination processor is configured to avoid processing signals that are received when the location determination signal quality assessment component determines that signals are likely to have insufficient location determination quality due to expected interference from the RF components.

15. The apparatus for location determination according to claim 11 further comprising a wireless transmitter that generates interfering signals, wherein the location determination signal quality assessment component is configured to determine the location determination quality from interfering signals based on at least one of known protocols, frequencies, amplitudes, time durations, and signaling of the wireless transmitter.

16. The apparatus for location determination according to claim 15 wherein the location determination signal quality assessment component is configured to suspend location determination during time periods of interfering signals from the wireless transmitter.

17. The apparatus for location determination according to claim 16 wherein the location determination signal quality assessment component is configured to restart location determination after interfering signals from the wireless transmitter are reduced.

18. The apparatus for location determination according to claim 15 wherein the location determination signal quality assessment component is configured to start location determination after interfering signals are reduced.

19. The apparatus for location determination according to claim 15 wherein the wireless transmitter comprises at least one of a cellular transmitter, wireless fidelity (WiFi) transmitter, Ultra-wideband transmitter, Wi-MAX transmitter, and a Bluetooth transmitter.

20. The apparatus for location determination according to claim 11 wherein the location determination receiver is configured to receive at least one of GPS signals, GLONASS signals, and Galileo signals.

* * * * *